United States Patent [19]

Yasuhara

[11] Patent Number: 4,515,690
[45] Date of Patent: May 7, 1985

[54] FUEL SUPPLY SYSTEM FOR DIESEL ENGINES

[75] Inventor: Seishi Yasuhara, Yokosuka, Japan

[73] Assignee: Nissan Motor Company, Limited, Japan

[21] Appl. No.: 514,796

[22] Filed: Jul. 19, 1983

[30] Foreign Application Priority Data

Aug. 6, 1982 [JP] Japan .............................. 57-120147[U]
Aug. 31, 1982 [JP] Japan .............................. 57-131383[U]
Mar. 10, 1983 [JP] Japan .............................. 58-34795[U]

[51] Int. Cl.³ ............................................. B01D 27/10
[52] U.S. Cl. ........................................ 210/90; 210/307; 210/313; 210/416.4
[58] Field of Search .................... 210/86, 90, 91, 114, 210/115, 184, 307, 313, 106, 108, 416.4

[56] References Cited

U.S. PATENT DOCUMENTS

| | | | |
|---|---|---|---|
| 2,767,851 | 10/1956 | Muller | 210/90 |
| 3,278,032 | 10/1966 | Smith | 210/186 X |
| 3,591,003 | 7/1971 | Cooper | 210/90 |
| 3,858,014 | 12/1974 | Hughes | 210/90 |
| 4,276,161 | 6/1981 | Matsui et al. | 210/86 |
| 4,321,136 | 3/1982 | Matsui | 210/86 |

FOREIGN PATENT DOCUMENTS

1047509 11/1966 United Kingdom ................. 210/90

Primary Examiner—John Adee
Attorney, Agent, or Firm—Lowe, King, Price & Becker

[57] ABSTRACT

An apparatus is provided informing when a filter located in a fuel passage between a fuel tank and a fuel injection pump has clogged a predetermined amount. The apparatus is responsive to fuel pressure downstream of the filter to provide an indication when the sensed pressure is below a predetermined value. A device for draining water separated from the fuel is also disclosed.

24 Claims, 14 Drawing Figures

FUEL SUPPLY SYSTEM FOR DIESEL ENGINES

BACKGROUND OF THE INVENTION

This invention relates to a fuel supply system including a source of fuel, a fuel injection pump, and a filter interposed between the fuel source and the fuel injection pump for delivery of fuel to a diesel engine and, more particularly, to an apparatus for use in the fuel supply system between the filter and the fuel injection pump informing whether the filter is clogged to a predetermined degree.

In order to provide high accuracy required in controlling injection of fuel into diesel engines, a filter has been provided in a fuel supply line between a fuel tank and a feed pump for filtering out water and other unwanted contaminants from the fuel flowing through the filter. It is conventional practice to replace the filter after a selected operational period determinative on the total distance traveled by the vehicle. Since it is required to provide a relatively large margin in determining the operational period of the filter, the filter may be replaced wastfully although it is still usable. In addition, the filter would clog up prior to servicing due to the use of contaminated fuel, restricting supply fuel to the fuel injection pump, and thereby limiting engine output at high engine speeds.

Accordingly, it is an object of the present invention to provide an improved fuel supply system informing when the filter clogs to a predetermined degree.

Another object is to provide a water draining device for draining water filtered from fuel out of the fuel supply system.

SUMMARY OF THE INVENTION

There is provided, in accordance with the present invention, an apparatus for use in a fuel supply system for supplying a controlled amount of fuel into a diesel engine. The fuel supply system includes a source of fuel, a fuel injection pump, and a fuel passage connected between the fuel source and the fuel injection pump. A filter is positioned in the fuel passage for filtering out unwanted contaminants before reaching the fuel injection pump. A pressure responsive means sensitive to pressure in the fuel passage downstream of the filter indicates when the filter clogs by sensing pressure below a predetermined value.

Preferably, the pressure responsive means includes a switch operable between first and second states and an actuator sensitive to the pressure in the fuel passage downstream of the filter. The actuator maintains the switch in the first state when the sensed pressure is above the predetermined value. The actuator changes the switch to the second state when the predetermined pressure value is reached. The pressure responsive means also includes an indicator operable to provide an indication in response to the second state of the switch.

In accordance with another aspect or the present invention, there is also provided a water draining device for use with a water separator having a chamber in which fuel and water are separated from each other into a lower phase being essentially water an an upper phase being essentially fuel. The water separator includes a bottom wall formed with a stepped recess having a small diameter portion opening downward into a large diameter portion. The water draining device comprises a plug having a small diameter portion and a large diameter portion. The plug large diameter portion is in fluid sealing contact with the recessed large diameter portion to form an inner chamber within the recess. The plug small diameter portion has a seal fixed thereon in fluid sealing contact with the recessed small diameter portion to divide the inner chamber into upper and lower chambers. First and second passages separately extend through the plug to connect the lower chamber to atmosphere. Third and fourth passages separately extend through the water separator bottom wall to connect the water separator chamber to the upper chamber. The plug large diameter portion is threaded into the recess large diameter portion to permit movement of the plug to bring the seal out of contact from the recessed small diameter portion so as to connect the lower chamber to the upper chamber.

Additional objects, advantages and novel features of the invention will be set forth in detail in part in the description which follows and in part will become apparent to those skilled in the art upon examination of the drawing, or may be learned by practice of the invention. The objects and advantages of the invention may be realized and attained by means of the instrumentalities and combinations particularly pointed out in the appended claims.

BRIEF DESCRIPTION OF THE DRAWINGS

The details as well as other features and advantages of this invention are set forth below and are shown in the accompanying drawings, in which.

DESCRIPTION OF THE PREFERRED EMBODIMENTS

Figure 1:
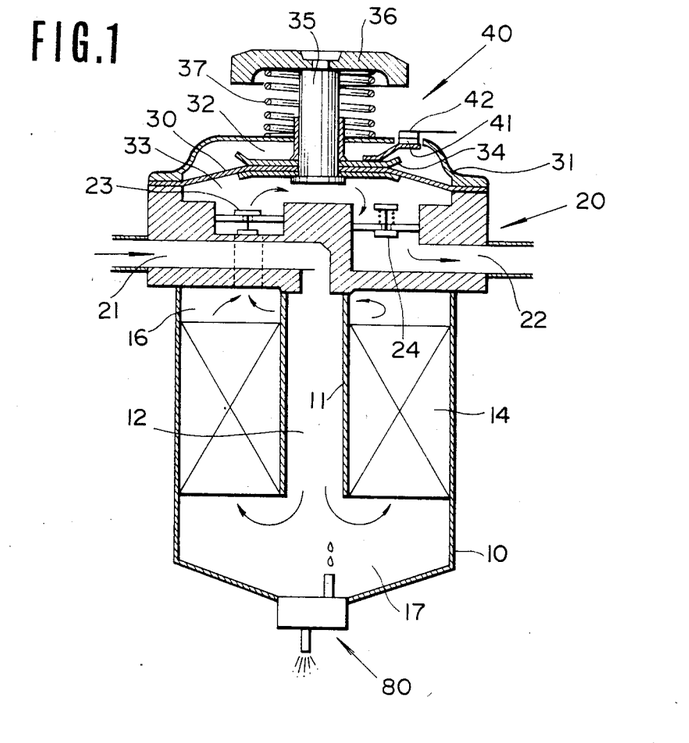
FIG. 1 is a sectional view showing one embodiment of a filter clogging detector in accordance with the present invention.

Referring now to FIG. 1, a tank 10 is closed at an upper open end thereof by a cap 20 to define a fuel chamber within the tank 10. A hollow cylinder 11, which defines therein a center passage 12, extends into the fuel chamber from the bottom surface of the cap 20.

A filter element 14 circumscribes the hollow cylinder 11 and divides the fuel chamber into upper and lower chambers 16 and 17 at the respective ends of the filter element 14. The lower chamber 17 is used as a water separation or sediment chamber wherein fuel and water are separated into an upper phase comprising fuel and a lower phase comprising water due to the difference between fuel and water densities.

The cap 20 has inlet and outlet passages 21 and 22 provided through the cap. The inlet passage 21 communicates, at an entrance end, with a conventional fuel reservoir (not shown) and, at an exit, with the center passage 12. The outlet passage 22 is connected, at an exit, to a conventional fuel injection pump (not shown). A diaphragm 30 is mounted between the cap 20 and a cover 31 to form therewith two chambers 32 and 33 on opposite sides of the diaphragm 30. The chamber 32 communicates with atmosphere while the chamber 33 is connected through a check valve 23 to the upper chamber 16 and also through a check valve 24 to the outlet passage 22. The check valve 23 permits flow from the upper chamber 16 to the chamber 33 but not vice versa, and the check valve 24 permits flow from the chamber 33 to the outlet passage 22 but not vice versa. An operation rod 35 is secured at its one end to the diaphragm 30 through upper and lower retainers which sandwich therebetween a part of the diaphragm 30 around its center. The operation rod 35 extends outwardly through the cover 31 and terminates in a knob 36. A compression coil spring 37 is seated between the cover 31 and the knob 36 to urge diaphragm 30 upward, expanding chamber 33. The mechanism including the diaphragm 30, the chamber 33, the operation rod 35, and the knob 36 can be used as a so-called priming pump to prime fuel into the fuel injection pump by manual operation of the knob 36 to move the diaphragm 30 up and down repetitively.

Located within the chamber 32 is a switch 40 which includes a pair of contacts 41 and 42, the switch contact 41 being supported in contact with the switch contact 42 by a resilient arm 43 extending from the upper retainer 34. The upper retainer 34 is grounded through the tank 10. The switch contact 41 comes out of contact with the switch contact 42 when the diaphragm 30 moves downwardly against the resilient force of the coil spring 37. The bias of the coil spring 37 is selected such that when the fuel pressure in the chamber 33 falls below a predetermined value, the atmospheric pressure in the chamber 22 overcomes the resilient force of the coil spring 37 to move the diaphragm 30 downward to a position opening switch 40.

Fuel for the engine is delivered by the fuel injection pump from the fuel reservoir through the inlet passage 21 and the center passage 12 into the lower chamber 17 and hence through the filter element 14 into the upper chamber 16. The fuel from the upper chamber 16 passes the check valve 23 into the chamber 33 where the fuel acts on the lower surface of the diaphragm 30 urging it upward, and then passes the check valve 24 into the outlet passage 22. The filter element 14 filters out water and other contaminants from the fuel passing therethrough and prevents them from reaching the fuel injection pump. With the passage of time, the filter element 14 gradually clogs to increase resistance to flow of fuel through the filter element and thereby cause an increase in the pressure differential across the filter element 14. The pressure differential across the filter element 14 is dependent upon the rate of fuel flow drawn by the fuel injection pump which is directly proportional to the speed of rotation of the engine as well as the degree of clogging of the filter element 14. If the filter element 14 clogs to a predetermined degree, the pressure in the chamber 33 decreases to such a level that the diaphragm 30 can move to a position bringing the switch contact 41 out of contact from the switch contact 42 when the engine rotational speed increases to a value. The predetermined degree of clogging of the filter element 14 can be freely adjusted by selecting the resilient force of coil spring 37. In practice, the resilient force of the coil spring 37 may be selected such that switch 40 opens at or immediately prior to when filter element 14 clogs to the point of inhibiting passage of an adequate amount of fuel required for high speed engine operation.

Figure 2:
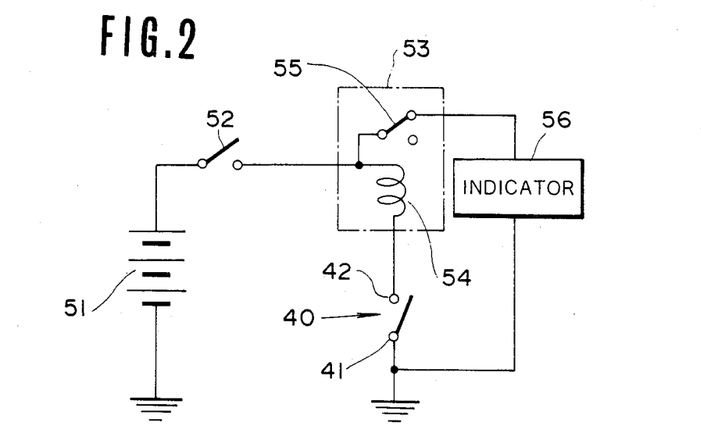
FIG. 2 is a circuit diagram showing the switch of FIG. 1 together with other circuit components for providing an indication informing a degree of clogging of the filter.

Referring to FIG. 2, switch 40 is shown in a circuit 50 with other circuit components. The switch contact 41 is grounded while the switch contact 42 is connected to one terminal of a relay coil 54 which controls a relay controlled switch 55. Another terminal of the relay coil 54 is connected through a main switch 52 to the positive terminal of a voltage source 51. The relay controlled switch 55 is in a position disconnecting an indicator 56 from the voltage source 51 upon energization of the relay coil 54. When the relay coil 54 is deenergized, the relay controlled switch 55 moves to another position connecting the indicator 56 across the voltage source 51 to provide a light or sound indication. The indicator 55 may comprises a warning light or a warning buzzer.

Assuming now that the filter element 14 does not clog the predetermined degree and the switch 40 is closed, the relay coil 54 is energized to hold the relay controlled switch 55 in a position disconnecting the indicator 56 from the voltage source 51. As a result, the indicator 56 provides no indication. When the filter element 14 get clogged to the predetermined degree, the switch 40 opens and the relay coil 54 is disenergized to shift the relay controlled switch 55 into a position connecting the indicator 56 to the voltage source 51. As a result, the indicator provides a light or sound indication to urge the vehicle operator to replace the filter element 14.

In order to reduce the possibility of the vehicle operator from overlooking the short indication, the circuit of FIG. 2 may be modified to includes a self-hold relay or a flip-flop so as to continue the light or sound indication after the engine speed falls.

Figure 3:
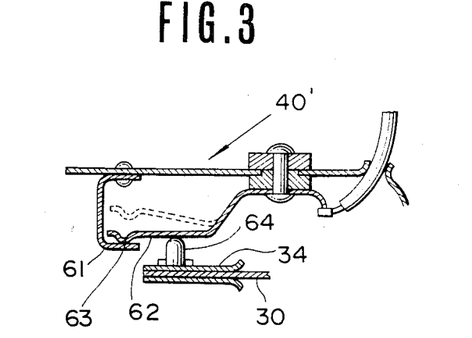
FIG. 3 is an enlarged sectional view showing a modification of the switch used in the filter clogging detector of FIG. 1.

Referring to FIG. 3, a modification of the switch 40 is illustrated wherein the switch 40' is normally open and is closed when the pressure in the chamber 33 falls below the predetermined value. The switch 40' comprises a stationary contact 61 grounded through the tank 10, and a movable arm 62 having a movable contact 63 located at the free end of the arm in overlying relation to the fixed contact 61. The movable arm 62 is shaped to urge the movable contact 63 into resilient contact with the fixed contact 61. An operating arm 64 extends upward from the upper retainer 34 and engages with the movable arm 62. The operating arm 64 normally pushes the movable arm 62 upward to bring the movable contact 63 out of contact with the stationary contact 61. When the pressure in the chamber 33 falls below the predetermined value, the operating arm 64 moves downwardly together with the downward movement of the diaphragm 30 to permit the movable contact 63 to move into contact with the fixed contact 61. With this arrangement, the switch 40' is connected in series with the indicator 56 and the voltage source 51, eliminating relay 53 from the circuit of FIG. 2.

Figure 4:
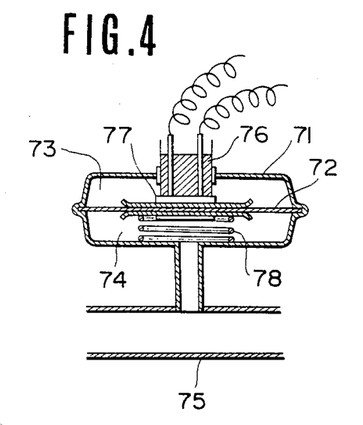
FIG. 4 is a sectional view showing another embodiment of the filter clogging detector of the present invention.

Referring to FIG. 4, there is illustrated a modification of the pressure responsive device which comprises a casing 71 having a diaphragm 72 provided within the casing 71 to form two chambers 73 and 74 on opposite sides of the diaphragm. The chamber 73 communicates with the atmosphere while the chamber 74 communicates with a fuel passage 75 leading from the upper chamber 16 (FIG. 1) to the fuel injection pump. A pair of fixed contacts is supported by an insulating member 76 which extends through the casing 71 into the chamber 73. The diaphragm 72 is partially sandwiched between upper and lower retainers, the upper retainer having thereon a movable contact plate 77. A compression coil spring 78 is located within the chamber 74 to urge the diaphragm 72 upward, contact plate 77 into engagement with the fixed contacts. The resilient force of the spring 78 is selected such that when the pressure in the chamber 74 falls below the predetermined value, the movable contact plate 77 moves downward out of contact from the fixed contacts. One of the fixed contacts is connected to ground, the other fixed contact is connected to the relay coil 54 in the same manner as shown in FIG. 2.

Fuel is introduced through the inlet passage 21 and the center passage 12 into the lower chamber 17 and hence through the filter element 12 into the chamber 33 and is delivered therefrom through the outlet passage 22 to the fuel injection pump. With the introduction of fuel into the lower chamber 17, water enters the lower chamber 17 wherein fuel and water are separate into an upper phase comprising fuel and a lower phase comprising water due to the difference between fuel and water densities. If water accumulates in the lower chamber 17 without being drained therefrom to the exterior, it will be delivered with fuel into the fuel injection pump. This may cause corrosion of the engine cylinder walls and in the fuel supply circuit including a fuel tank and fuel lines and, particularly for a diesel engine, cause baking on parts moving at high speeds in the fuel injection pump. As a result of baking, the fuel injection pump does not function efficiently (i.e.) fuel injection performance is degraded increasing the likelihood of engine stalls and failure.

To drain water from the lower chamber 17, a water draining device 80 is provided at the bottom of the tank 10, as shown in FIG. 1. The water draining device utilizes the fact that draining of liquid contained in a vessel through a water drain pipe provided through the bottom wall of the vessel is facilitated by the use of an air inlet pipe extending through the vessel bottom wall into the vessel. To efficiently drain liquid, the difference in height between the inlet opening of the water drain pipe and the exit opening of the air inlet pipe should be equal to or greater than a predetermined value dependent upon the density of the liquid to be drained. If the height difference is less than the predetermined value, the liquid drain pipe will partially carry air flowing in the direction opposite to the drained liquid flow direction and the air inlet pipe will partially carry liquid flowing in the direction opposite to the introduced air flow direction, degrading liquid draining efficiency. Upon draining water, the height difference is required to be 10 mm or more.

Figure 5:
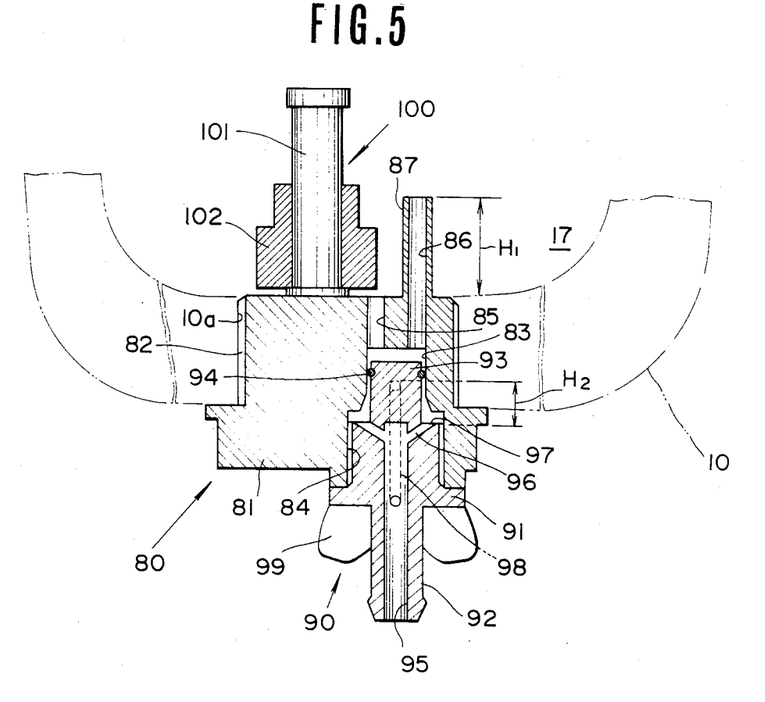
FIG. 5 is an enlarged sectional view showing a water draining device of the present invention.

Referring to FIG. 5, water draining device 80 comprises a support member 81 provided with an externally threaded portion 82 engaging internally threaded opening 10a formed in the bottom wall of the tank 10. Preferably, the top surface of the support member 81 is co-planar with respect to the inner surface of the tank bottom wall. The support member 81 has a longitudinally extending bore have a small diameter recess 83 and an internally threaded, large diameter recess 84. The small diameter recess 83 is connected to the lower chamber 17 through a water drain passage 85 and an air passage 86, both passages provided through support member 81. The water drain passage 85 opens into the lower chamber 17 directly from the support member top surface while the air passage 86 further extends a length H1 through an extension 87 which extends a length H1 into the lower chamber 17 from the support member top surface. Thus, the air passage opening is located within the lower chamber 17 at a point a distance H1, for example, 15 mm higher than the water drain passage opening.

A stepped plug 90 is placed in the longitudinally extending bore formed in the support member 81 to define therewith an intermediate chamber 88. The plug 90 has an externally threaded, large diameter portion 91 engaging internally threaded recess 84, and an extended portion 92 projecting downward from the large diameter portion 91. Plug 90 also has a small diameter portion 93 having an O-ring 94 secured thereon in fluid-sealing contact with the inner surface of the small diameter recess 83. A water drain passage 95 is formed through the large diameter portion 91 and the extended portion 92 and is connected to the intermediate chamber 88 through a plurality of radially and upwardly extending passages 96 opening into the intermediate chamber 88 from the shoulder 97 of the plug 90. The water drain passage 95 has a diameter somewhat larger than that of the water drain passage 85. An air passage 98 is provided through the plug 90. The air passage 98 opens, at an entrance end, into the exterior and, at an exit, into the intermediate chamber 88 at a point just below the O-ring 94. The upper opening of the air passage 98 is located a distance H2 higher than the upper openings of the radially and upwardly extending passages 97. The distance H2 may be set at about 10 mm.

The reference numeral 100 designates a water level detector which comprises a guide tube 101 extending upwardly from the support member 81, and a float 102 floating up and down on the surface of water accumulated in the lower chamber 17 concentrically around the hollow tube 101.

The operation of the water draining device 80 is generally as follows. When fuel and water separate due to the difference in their densities and the separated water accumulates in the lower chamber 17, the handle 99 may be manually rotated to retract the plug 90 to a position wherein the O-ring 94 comes out of engagement from the inner surface of the small diameter recess 83. As a result, the water drain passage 85 and the air inlet passage 86 communicate through the intermediate chamber 88 with the water drain passage 95 and the air inlet passage 98. That is, the lower chamber 17 is connected to the exterior through the passages 85, 86, 95 and 98. Because of this, the separated water is discharged from the lower chamber 17 to the exterior through the water drain passage 85, the intermediate chamber 88, and the water drain passage 95 while air is introduced into the lower chamber 17 through the air inlet passage 20, the intermediate chamber 88 and the air inlet passage 86. Since the diameter of the water drain passage 95 is somewhat larger than that of the water drain passage 85, the water entering the intermediate chamber 88 from the water drain passage 85 will immediately flow through the water drain passage 95 to the exterior without standing in the intermediate chamber 88. Thus, a somewhat negative pressure appears in the intermediate chamber 88 so that air is sucked through the air inlet passage 98 from the exterior into the intermediate chamber 88 and is introduced through the air inlet passage 86 into the lower chamber 17. Thereafter, the water draining operation continues by a so-called syphon effect.

Figure 6:
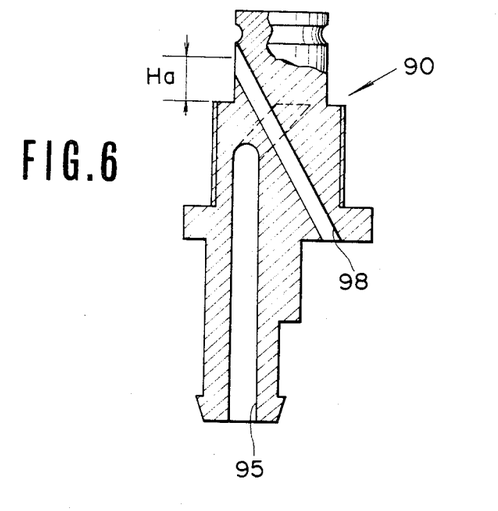
FIGS. 6–8 are enlarged sectional views showing various modifications of the plug used in the water draining device of FIG. 5.
Figure 7:
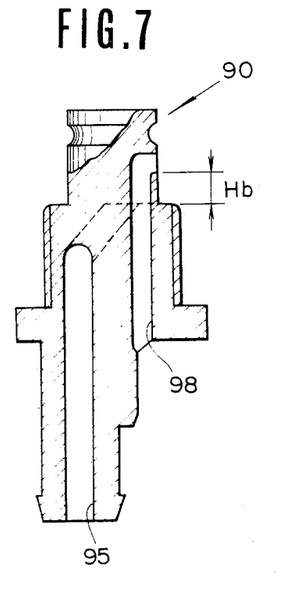
Figure 8:
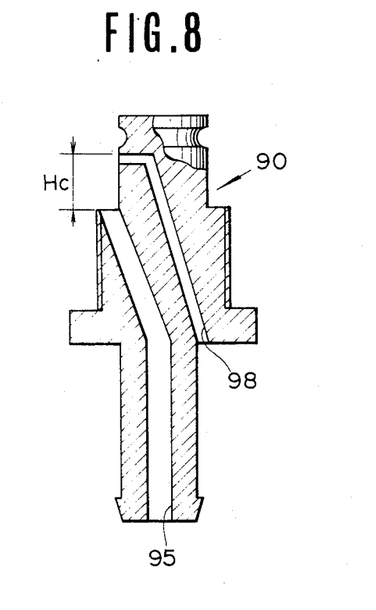

FIG. 6–8 illustrate several modifications of the plug 90 wherein like reference numerals have been applied with respect to the equivalent components shown in FIG. 5. In these modifications, the air inlet passage 98 opens into the intermediate chamber at a point higher than the inlet opening of the water drain passage 95. The height differences Ha, Hb and Hc between the outlet opening of the air inlet passage 98 and the inlet opening of the water drain passage 95 are set at 10 mm.

Referring to FIGS. 9A to 9D, there is illustrated another embodiment of the water draining device of the present invention wherein water and air flow through independent passages, respectively. Like reference numerals have been applied to FIGS. 9A to 9D with respect to the equivalent components shown in FIG. 5.

In this embodiment, the water draining device comprises a support member 181 provided with an externally threaded portion 182 which is threadably engaged with an internally threaded opening 10a formed in the bottom wall of the tank 10. It is preferable that the top surface of the support member 181 to be co-planar with respect to the inner surface of the tank bottom wall. The support member 181 has a longitudinally extending bore having a small diameter recess 182 and a large diameter recess 183 which opens out of the bottom of the support member 181 in an internally threaded, enlarged recess 184. The small diameter recess 182 is connected to the lower chamber 17 through a water drain passage 185 which is off-axis with respect to the small diameter recess 182. An air inlet passage 186 is provided through the support member 181. The water drain passage 85 opens into the lower chamber 17 directly from the support member top surface while the air passage 186 further extends a length H3, for example, 15 mm into the lower chamber 17 through an extension 187 which extends a length H3 into the lower chamber 17 from the support member top surface. Thus, the air passage opening is located within the lower chamber 17 at a point a distance H3 higher than the water draining passage opening.

A stepped plug 190 is placed in the longitudinally extending bore formed through the support member 181 to define therewith upper and lower chambers 188 and 189. The plug 190 has an externally threaded, large diameter portion 190a threadably engaged with the internally threaded recess 184, an extended portion 190b extending downwardly from the large diameter portion 190a, an intermediate diameter portion 190c having an O-ring 192 secured thereon in fluid-sealing contact with the inner surface of the large diameter recess 183, and a small diameter portion 190d having an O-ring 193 secured thereon in fluid-sealing contact with the inner surface of the small diameter recess 182. The plug 190 is formed therein with a water drain passage 195 longitudinally extending the full length of the plug 190. The support member 181 has a valving surface 181a which cooperates with the upper opening of the water drain passage 195.

The upper chamber 188 communicates with the air passage 186, and the lower chamber 189 communicates with the exterior through an air passage 197 provided through the support member 181 and also with the water drain passage 195 through a passage 198 provided through the plug 190.

The operation is as follows: To drain water accumulated in the lower chamber 17, the operator may manually rotate the handle 199 to retract the plug 190 from the position illustrated in FIG. 9C to the position illustrated in FIG. 9D where the O-ring 193 comes out of engagement from the inner surface of the large diameter recess 183. As a result, the water drain passage 185 is connected via the valving surface 181a to the water drain passage 195 while the air passage 186 is connected through the upper and lower chambers 188 and 189 to the air passage 197. Because of this, the accumulated water is discharged from the water separation chamber 17 to the exterior through the water drain passages 185 and 195 while air is introduced into the water separation chamber 17 through the air passages 197 and 186.

Figure 9A:
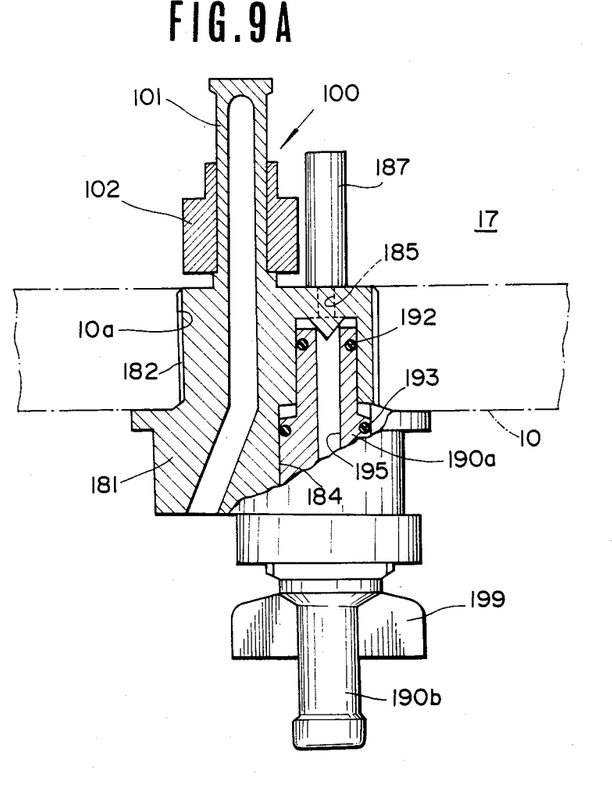
FIG. 9A is a fragmentary sectional view showing another form of the water draining device.
Figure 9B:
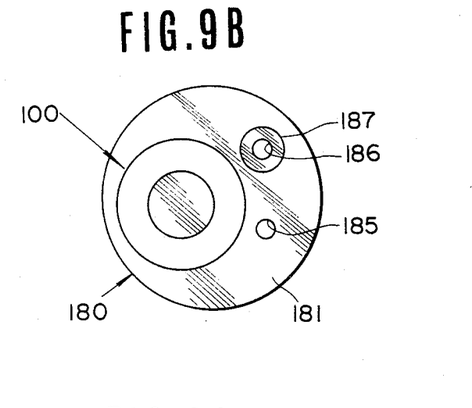
FIG. 9B is an elevational view of the water draining device of FIG. 9A.
Figure 9C:
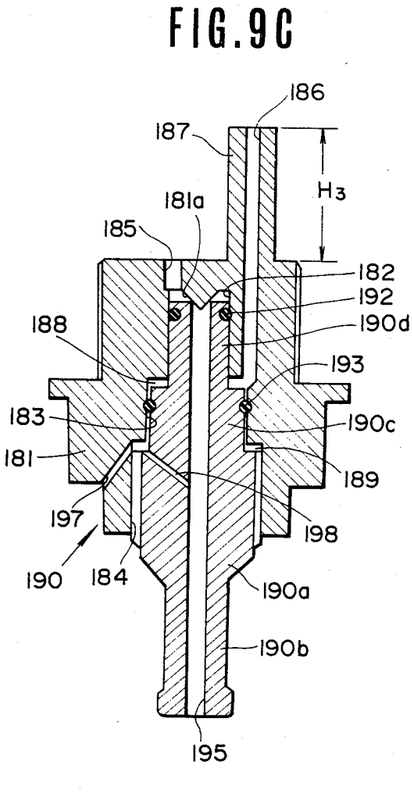
FIG. 9C is a sectional view of the water draining device of FIG. 9A with the parts in the closed positions.
Figure 9D:
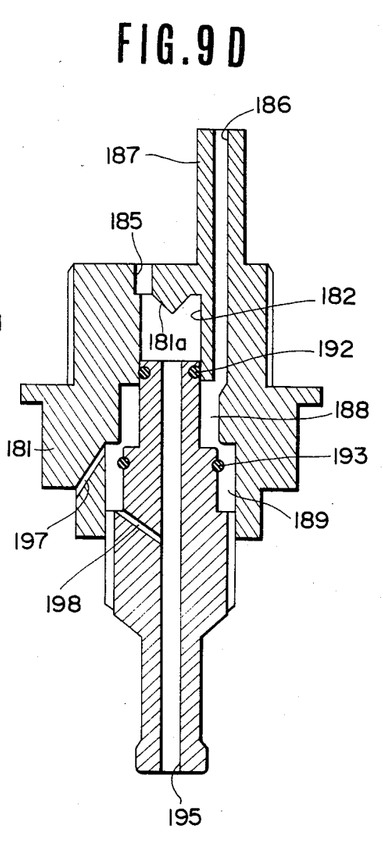
FIG. 9D is a view similar to FIG. 9C with the parts in the water draining positions.

In this embodiment, the upper opening of the water drain passage 195 opens to communicate the water separation chamber 17 to the exterior through the water drain passages 185 and 195 before the O-ring 193 comes out of engagement from the inner surface of the large diameter recess 183 to communicate the water separation chamber 17 with the exterior through the air passages 197 and 186. Thus, water and air flow through respective separate passages without mixing with each other. This arrangement provides higher water draining efficiency as compared to the first embodiment of FIG. 5.

The water and/or fuel accumulated in the lower chamber 189 is drawn through the passage 198 under a negative pressure created in the passage 198 due to a syphone effect caused by water flowing down through the water drain passage 195. This passage 198 is effective to preclude the likelihood soiling the operator's hand with water and/or fuel pushed down through the air passage 197 when the plug 190 is moved from the position illustrated in FIG. 9D to the position illustrated in FIG. 9C. Preferably, the passage 186 has a diameter somewhat smaller than that of the air passage 186.

Figure 10:
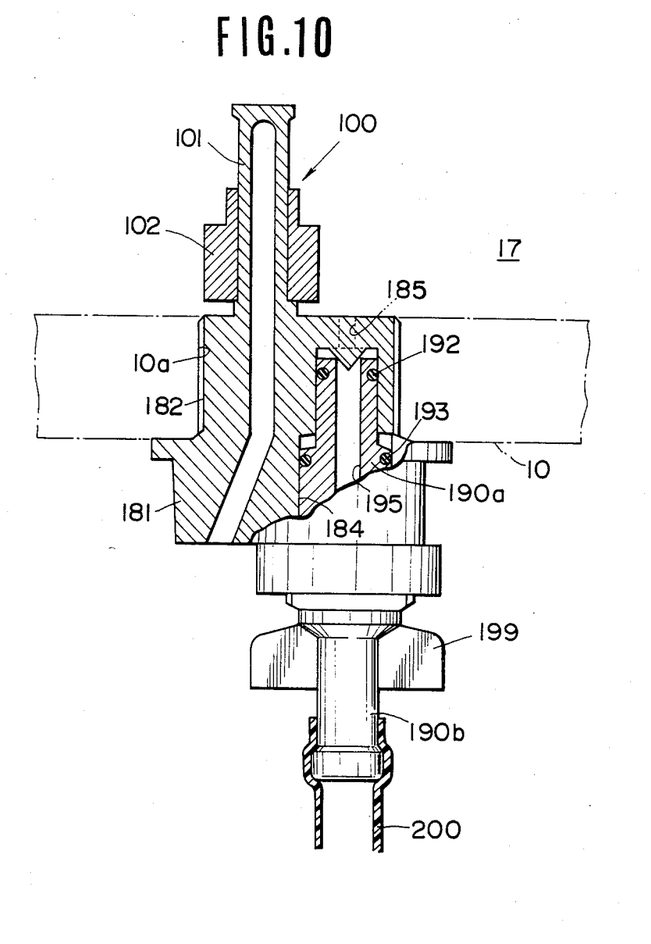
FIG. 10 is a sectional view showing a modified form of the water draining device.

While the extension 187 has been described as having a length H3 of about 15 mm, it is to be noted that the air passage 186 may be designed to open into the water separation chamber 17 directly from the support member top surface with the extension 187 being removed in the case where a hose or another drain pipe 200 is connected to the lower end of the extension 195, as shown in FIG. 10. In addition, while the water draining device has been described in connection with a water separation chamber in which a filter is positioned, it is to be understood that the water draining device may be used for a water separation tank separated from the filter.

Although it is preferable to avoid mixing air in fuel which may cause engine stalling for diesel engines, no trouble occurs for diesel engines associated with a fuel injection pump, such for example as a distributor (VE) type fuel injection pump made by Robert Bosch GmbH, Germany, which includes a device for discharging air mixed in fuel.

Figure 11:
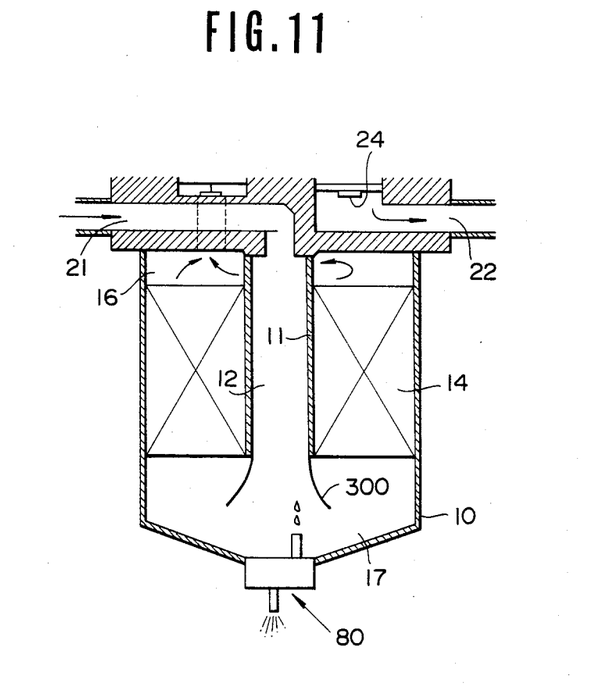
FIG. 11 is a fragmentary sectional view showing a guide member used in the water separation chamber.

Referring to FIG. 11, a downwardly flared guide member 300 is mounted to the exit opening of the center passage 12 to collect air introduced into the water separation chamber while water is drained through the water draining device. The collected air is standing in the upper portion of the center passage 12 during engine starting and idling operations. The collected air is fed along with an increased flow of fuel into the filter as the engine speed increases.

Although the present invention has been described in connection with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. Apparatus for use in a fuel supply system supplying controlled amounts of fuel into a diesel engine, said fuel supply system including a source of fuel, a fuel injection pump, and a fuel passage connected between said fuel source and said fuel injection pump, said apparatus comprising:
   (a) a filter for filtering out contaminants from fuel, said filter positioned in said fuel passage upstream of said fuel injection pump;
   (b) a priming pump for priming fuel to said fuel injection pump, said priming pump including:
   a casing;
   a priming pump diaphragm provided in said casing to form first and second chambers on opposite sides of said diaphragm, said first chamber communicating with the atmosphere, said second chamber forming a part of said fuel passage between said filter and said fuel injection pump, said priming pump diaphragm being moveable to direct fuel from said second chamber into the fuel injection pump; and
   resilient means for urging said diaphragm towards said first chamber;
   valving means for permitting fuel flow only in a direction (1) from said filter to said second chamber and (2) from said second chamber to said fuel injection pump;
   (c) a switch operable between first and second states in response to movement of said priming pump diaphragm caused by variations in pressure in said second chamber, said switch being in said first state when the pressure in said second chamber is above a predetermined value, said switch changing to said second state when the pressure in said second chamber decreases to said predetermined pressure value; and
   (d) an indicator responsive to said second state of said switch for providing an indication informing that said filter is clogging.

2. The apparatus of claim 1, wherein said switch includes first and second switch contacts normally held in contact with each other, said first switch contact being connected to said diaphragm for movement therewith out of contact from said second switch contact when said diaphragm moves to a position inducing the second state of the switch.

3. The apparatus of claim 1, wherein said switch includes first and second switch contacts normally held out of contact from each other, said first switch contact being connected to said diaphragm for movement therewith into contact with said second switch contact when said diaphragm moves to a position inducing the second state of the switch.

4. The apparatus of claim 3, wherein said indicator includes a source of voltage and a warning light, and wherein said switch is connected in series between said voltage source and said warning light.

5. The apparatus of claim 3, wherein said indicator includes a source of voltage and a warning buzzer, and wherein said switch is connected in series between said voltage source and said warning buzzer.

6. The apparatus of claim 1, wherein said switch includes a pair of fixed contacts and a movable contact, said movable contact being connected to said diaphragm for movement therewith into contact with both of said fixed contacts.

7. The apparatus of claim 1, wherein said indicator includes a source of voltage, a warning light, and means responsive to said second state of said switch for connecting said warning light across said voltage source to provide a light indication.

8. The apparatus of claim 1, wherein said indicator includes a source of voltage, a warning buzzer, and means responsive to said second state of said switch for connecting said warning buzzer across said voltage source to provide a sound indication.

9. A water draining device for use with a water separator having a chamber in which fuel and water are separated from each other into a lower phase being essentially water and an upper phase being essentially fuel, said water separator including a bottom wall formed with a stepped recess having a small diameter portion opening downward into a large diameter portion, the water draining device comprising:
   a plug having a small diameter portion and a large diameter portion, said plug large diameter portion being in fluid-sealing contact with said recess large diameter portion to form an inner chamber within said recess, said plug small diameter portion having a seal fixed thereon in fluid-sealing contact with said recess small diameter portion to divide said inner chamber into upper and lower chambers;
   first and second passages separately extending through said water separator bottom wall to to connect said water separator chamber to said upper chamber; and
   said plug large diameter portion being threadably engaged with said recess large diameter portion to permit movement of said plug to bring said seal out of contact from said recess small diameter portion so as to connect said lower chamber to said upper chamber, said second and fourth passages arranged to carry and drain water from the water separator chamber and said first and third passages arranged to contain air communicating with the second and fourth passages to facilitate draining of water therefrom when said lower chamber is connected to the upper chamber.

10. The device of claim 9, wherein said first passage opens into said lower chamber a predetermined distance higher than does said second passage.

11. The device of claim 10, wherein said predetermined distance is approximately 10 mm.

12. The device of claim 10, wherein said second passage has a diameter larger than that of said first passage.

13. The device of claim 9, wherein said third passage opens into said water separator chamber a predetermined distance higher than does said fourth passage.

14. The device of claim 13, wherein said predetermined distance is approximately 15 mm.

15. The device of claim 9, wherein said plug has an extension extending downwardly from the bottom of said plug, said extension having therein a passage forming a part of said second passage.

16. A water draining device for use with a water separator having a bottom wall and a chamber in which fuel and water are separated into a lower phase of essentially water and an upper phase of essentially fuel, comprising:
  (a) a support member provided in said water separator bottom wall, said support member including a stepped recess having a small diameter portion opening downward into a large diameter portion;
  (b) a plug having small and large diameter portions, said plug large diameter portion being in fluid-sealing contact with said recess large diameter portion to form an inner chamber within said recess, said plug small diameter portion having a seal member fixed thereon in fluid-sealing contact with said recess small diameter portion to divide said inner chamber into upper and lower chambers, said plug having first and second passages extending therethrough to independently connect said lower chamber to the atmosphere; and
  (c) said support member having third and fourth passages extending therethrough to independently connect said water separator chamber to said upper chamber; and
  (d) said plug large diameter portion being threadably engaged with said recess large diameter portion to permit movement of said plug to bring said seal member out of contact from said recess small diameter portion so as to connect said lower chamber to said upper chamber, said second and fourth passages arranged to carry and drain water from the water separator chamber and said first and third passages arranged to contain air communicating with the second and fourth passages to facilitate draining of water therefrom when said lower chamber is connected to the upper chamber.

17. A water draining device for use with a water separator having a chamber in which fuel and water are separated into a lower phase being essentially water and an upper phase being essentially fuel, comprising:
  (a) said water separator having a bottom wall formed with a stepped recess having small, intermediate, and large diameter portions;
  (b) a plug having small, intermediate, and large diameter portions, said plug large diameter portion being in fluid-sealing contact with said recess large diameter portion to form an inner chamber within said recess, said plug intermediate portion having a first seal fixed thereon in fluid-sealing contact with said recess intermediate portion to divide said inner chamber into first and second chambers, said plug small diameter portion having a second seal fixed thereon in fluid-sealing contact with said recess small diameter portion to divide said second chamber into third and fourth chambers;
  (c) a first passage extending through said water separator bottom wall to connect said first chamber to atmosphere;
  (d) a second passage extending through said plug to connect said fourth chamber to the atmosphere, said second passage opening at an upper opening into said fourth chamber;
  (e) a third passage extending through said water separator bottom wall to connect said water separator chamber to said third chamber;
  (f) a fourth passage extending through said water separator bottom wall to connect said water separator chamber to said fourth chamber;
  (g) a valving member normally held in contact with said second passage upper opening to close the same; and
  (h) said plug large diameter portion being threadably engaged with said recess large diameter portion to permit movement of said plug to bring said second passage upper opening out of contact from said valving member so as to connect said passage to said fourth chamber and then bring said first seal out of contact from said recess intermediate portion so as to connect said first chamber to said third chamber, said second and fourth passages arranged to carry and drain water from the water separator chamber when said plug member is moved to bring said second passage upper opening out of contact with said valving member, said first and third passages arranged to carry air flowing to act upon water in said water separator chamber when said second passage upper opening is out of contact with said valving member to facilitate draining of water through said second and fourth passageways.

18. A water draining device for use with a water separator having a bottom wall and a chamber in which fuel and water are separated into a lower phase comprising water and an upper phase comprising fuel, comprising:
  (a) a support member provided in said water separator bottom wall, said support member having therein a stepped recess having a small diameter portion opening downward into an intermediate diameter portion opening downward into a large diameter portion;
  (b) a plug having small, intermediate, and large diameter portions, said plug large diameter portion being in fluid-sealing contact with said recess large diameter portion to form an inner chamber within said recess, said plug intermediate portion having a first seal fixed thereon in fluid-sealing contact with said recess intermediate portion to divide said inner chamber into first and second chambers, said plug small diameter portion having a second seal fixed thereon in fluid-sealing contact with said recess small diameter portion to divide said second chamber into third and fourth chambers, said plug having a second passage extending therethrough to connect said fourth chamber to the atmosphere, said second passage opening at an upper opening into said fourth chamber;
  (c) said support member having first, third and fourth passages extending therethrough, said first passage connecting said first chamber to atmosphere, said third passage connecting said water separator chamber to said third chamber, said fourth passage connecting said water separator chamber to said fourth chamber;
  (d) a valving member normally held in contact with said second passage upper opening to close the same; and
  (e) said plug large diameter portion being threadably engaged with said recess large diameter portion to permit movement of said plug to bring said second passage upper opening out of contact from said valving member so as to connect said second passage to saif fourth chamber and then bring said first seal out of contact from said recess intermediate portion so as to connect said first chamber to said third chamber, said second and fourth passages arranged to carry and drain water from the water separator chamber when said plug member is moved to bring said second passage upper opening out of contact with said valving member, said first and third passages arranged to carry air flowing to act upon water in said water separator chamber when said second passage upper opening is out of contact with said valving member to facilitate draining of water through said second and fourth passages.

19. The device of claim 17 or 18, wherein said first chamber is connected to said second passage through a fifth passage provided through said plug.

20. The device of claim 19, wherein said fifth passage extends from said first chamber to said second passage downwardly and transversely of said plug.

21. The device of claim 17 or 18, wherein said third passage opens into said water separator chamber a predetermined distance higher than does said fourth passage.

22. The device of claim 21, wherein said predetermined distance is approximately 15 mm.

23. The device of claim 17 or 18, further comprising a water draining hose connected to the lower opening of said second passage.

24. A fuel filtering system for use in a fuel system supplying controlled amounts of fuel into a diesel engine, said fuel supply system including a source of fuel, a fuel injection pump, a fuel passage connected between said fuel source and said fuel injection pump, and a filter positioned in said fuel passage for filtering contaminants from fuel upstream of said fuel injection pump, comprising:
 (a) pressure responsive means sensitive to fuel pressure in said fuel passage downstream of said filter to provide an indication, utilizing atmospheric pressure as a reference pressure, of said filter clogging a predetermined degree by sensing when the downstream pressure decreases to a predetermined value; and
 (b) means actuated by the pressure responsive means for informing a vehicle occupant that said filter is clogged to said predetermined degree.

* * * * *